Oct. 2, 1956

W. UHR 2,765,033

TELEPHONE TIMER

Filed June 7, 1955

INVENTOR.

WILLIAM UHR

BY

Joshua R. H. Potts

HIS ATTORNEY

United States Patent Office 2,765,033

Patented Oct. 2, 1956

2,765,033

TELEPHONE TIMER

William Uhr, Havertown, Pa.

Application June 7, 1955, Serial No. 513,863

5 Claims. (Cl. 161—19)

This invention relates to improvements in timing devices, and in particular, to a telephone timer.

Many telephone charges are based on the length of time during which the phone is used, as an example: long distance calls usually are charged on the basis of so much for the first three minutes plus so much for each additional three minutes or fraction thereof. Also, many types of local services are charged for in accordance with the length of the period of use of the telephone. The average person is unable to accurately judge these intervals or time periods on which the phone companies' rates are determined. It is obviously desirable that some means be provided for conveniently indicating the end of the time allowed for a particular charge. With such a device, a user can more easily and accurately time his conversations and thus stay within a charge which he has predetermined as desirable for the particular call. Accordingly, an object of my invention is to provide a timing device for use with an instrument such as a telephone by which the passage of time will be indicated.

A further object of the invention is to provide a device which can be associated or attached to a telephone and used for timing the use of the phone to which it is attached. With such a device, the timer is always associated with the phone. If the timer is not connected to or otherwise associated directly with the telephone, it is apt to be inconvenient to locate or use at all times.

A further object of my invention is to provide an attachment comprising a timer which can be connected to the usual telephone without disfiguring or otherwise altering the telephone.

A still further object of my invention is to provide a timing device for connection to a telephone which is of simple construction, yet which is rigid and otherwise satisfactory for the intended purposes.

The objects of the invention also include providing a timing device including a simple timing means which is not subject to derangement and which will always function to give a predetermined time period. According to the invention, an hour-glass type of timing device is used. With such a device the time period is always the same.

It is yet another object of the invention to provide an attachment adapted to be connected to telephones on which there is mounted an hour-glass type of timing device with means for readily initiating the timing action.

These, and other objects and advantages, will become apparent from the following description and accompanying drawings in which Figure 1 is a perspective view illustrating a telephone in use and an attachment constructed in accordance with the invention connected thereto.

Similar reference characters in the several views indicate similar parts.

Figures 1, 2, 3, 4, 5, 6:
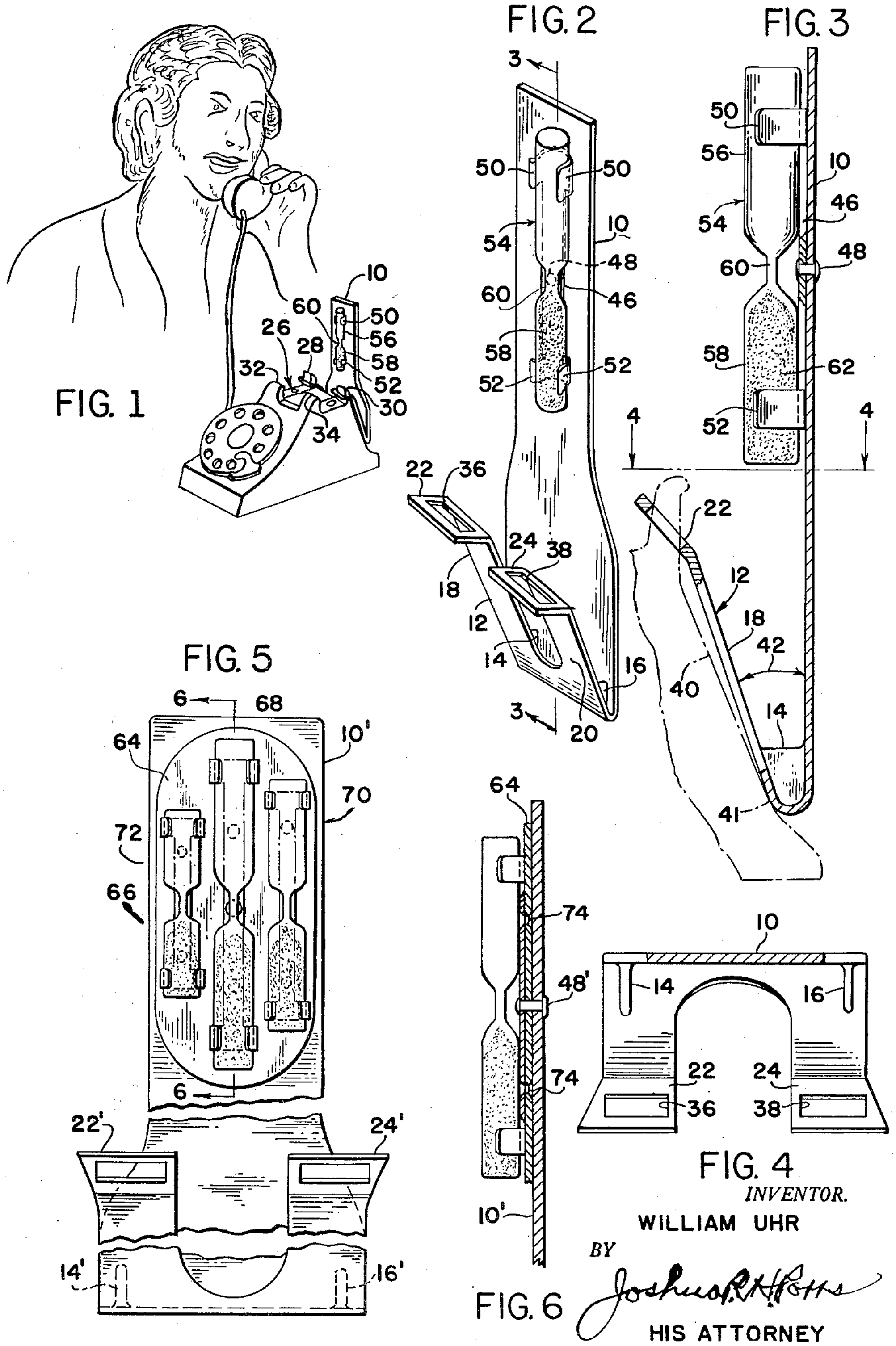
Figure 2 is an enlarged perspective view of the device constructed in accordance with the invention.
Figure 3 is a sectional view taken along line 3—3 of Fig. 2.
Figure 4 is a sectional view taken along line 4—4 of Fig. 3.
Figure 5 is a front elevational view of another form of the invention.
Figure 6 is a fragmentary sectional view taken along line 6—6 of Fig. 5.

Referring now in particular to the drawings, in its preferred form a timing device constructed in accordance with the invention comprises a base 10 and a flange 12 connected to the base. Flange 12 preferably is formed as a continuation of the base by bending the flange upwardly from the base. Flange 12 extends at an angle of approximately 20° with respect to the base. Webs 14 and 16 are affixed to flange 12 and the base 10 and serve to stiffen the attachment, preventing relative movement between base 10 and flange 12.

Flange 12 is bifurcated to provide legs 18 and 20. At the upper ends, as seen in Figs. 2 and 3, legs 18 and 20 have angularly offset portions 22 and 24. These are set at about 15° with respect to the main portions of legs 18 and 20.

A telephone instrument such as illustrated in Fig. 1 has a cradle, generally indicated at 26, in which the housing containing the earpiece and mouthpiece is mounted and is adapted to rest when the phone is not in use. The cradle is defined in part by lugs 28, 30, 32, and 34. The angularly offset portions of legs 18 and 20 are pierced to provide lug-receiving openings 36 and 38. The latter openings are adapted to receive lugs 28 and 30. The bifurcated legs 18 and 20 and the openings 36 and 38 respectively formed therein are spaced apart to conform with the spacing of lugs 28 and 30.

Referring now to Fig. 3: the telephone instrument has a downwardly and rearwardly sloping side 40. The acute angle which side 40 makes with the vertical is substantially the same as the included angle 42. As a result, base 10 is in a substantially vertical position when the attachment is connected to the telephone instrument. In other words, the angle 42 is chosen so that when flange 12 contacts side 40, base 10 will be substantially vertical. With the spaced openings 36, 38 receiving the spaced lugs 28 and 30, the contact point 44 will strike side 40 at the proper point to maintain the substantially vertical position of the base indicated in the drawings.

Clip plate 46 is pivotally connected to base 10 preferably by rivet 48. The clip plate may comprise a sheet of plastic material. Clips 50, 52 are mounted on plate 46. Clips 50 and 52 are resilient and may either comprise separate elements connected to plate 46 or may be formed integrally therewith. Hour-glass 54 is removably received and supported by clips 50, 52. The hour-glass is of the usual construction and comprises two glass or plastic bulbs 56, 58, one above the other, connected by a narrow neck 60. A quantity of sand 62 is trapped in the hour-glass, as is commonly known. The hour-glass may be designed to give a time period of three minutes, for example.

When a phone call is being initated, the hour-glass clip plate 46 can be rotated by grasping the hour-glass and twisting. By rotating 90° the sand will be started moving from one bulb to the other. This will give the user a visual indication of the passage of time and the impending termination of the period selected.

It is seen that the apparatus heretofore described is adapted to remain associated with the telephone and is ready for instant use.

I illustrate another form of the invention in Figs. 5 and 6. In the second form of the invention, the structure of the base 10', webs 14' and 16', and the spaced offset portions 22', 24', can be identical with the corresponding elements heretofore described.

Clip plate 64, however, serves as a support for a number of clip members 66, 68, and 70. Each of the clip members supports an hour-glass such as 72; and each of the clip members is attached to plate 64 by spaced fastening devices such as rivets 74. With the apparatus illustrated in Figs. 5 and 6, a number of time periods can be indicated with a single attachment. One hour-glass can provide a three-minute period; a second a two-minute period; and a third a one-minute period, for example. Obviously, any number of hour-glasses can be used and the periods can be selected at will. The clip members 66, 68, and 70 can be formed similarly to clip plate 46 and its associated clips 50, 52. Furthermore, in both forms of the invention described herein, the hour-glasses can be changed. Also, the spaced openings of the bifurcated legs 18, 20, and the legs themselves, can be changed or adapted to the various makes of telephones.

From the foregoing description, it is apparent that I have devised a simple timing device which can be connected to the usual telephone and which will provide a convenient, accurate, and easy-to-use means of indicating the period of use of the telephone.

While I have chosen and described a preferred form of the invention, variations thereof may be possible without departing from the spirit of the invention. It is therefore not intended that the invention be limited to the particular form disclosed, but only to the inventive concept as defined by the appended claims.

What I claim is:

1. A timer for timing telephone conversations comprising a base, a flange connected to said base, means forming spaced openings in said flange adapted to receive spaced cradle-forming lugs of a telephone instrument, and an hour-glass timer pivotally mounted on said base.

2. A telephone timer comprising a base, a flange connected to said base and extending outwardly therefrom, means forming spaced openings in said flange adapted to receive telephone cradle lugs, a plate pivotally connected to said base, and an hour-glass mounted on said plate, said hour-glass being rotatable with said plate on said base.

3. A timer for timing telephone usage comprising a base, a flange formed as an extension of said base and extending at an angle with respect thereto, a web connected to said flange and to said base and serving to fix the angular position of said flange with respect to said base, said flange being bifurcated to form spaced legs, each of said legs having an angularly offset portion adjacent its end, said angularly offset portions being in longitudinal alignment, each of said offset portions being pierced to provide spaced openings, said openings being adapted to receive a pair of longitudinally aligned lugs forming part of the cradle of a telephone instrument, a plate extending parallel to said base, means pivotally connecting said plate to said base, clip means mounted on said plate, and an hour-glass timing means removably supported by said clip means, said timing means being movable to initiate the operation thereof by rotation of said plate on said base.

4. A telephone timer comprising a base, a flange fixedly connected to said base, said flange comprising bifurcated parallel legs, each of said legs being pierced to provide spaced openings aligned longitudinally thereof, said openings being adapted to receive spaced telephone cradle lugs, said flange depending below said openings when said timer is mounted on a telephone, and being adapted to contact said telephone and maintain said base in a vertical position, and an hour-glass timer pivotally mounted on said base.

5. A timing device adapted to be connected to a telephone, comprising a base, a flange connected to said base, spaced openings in said flange adapted to receive spaced telephone cradle lugs, a plate pivotally mounted on said base, clip members connected to said plate, and an hour-glass timer connected to each of said clip members.

No references cited.